(12) United States Patent
Nasshan et al.

(10) Patent No.: US 8,550,563 B2
(45) Date of Patent: Oct. 8, 2013

(54) VEHICLE SEAT COMPRISING FIXTURES

(75) Inventors: Jürgen Nasshan, Kaiserslautern (DE); Martin Scheib, Kappeln (DE); Roman Lenz, Kaiserlautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 384 days.

(21) Appl. No.: 12/863,079

(22) PCT Filed: Apr. 28, 2009

(86) PCT No.: PCT/EP2009/003058
§ 371 (c)(1), (2), (4) Date: Jul. 15, 2010

(87) PCT Pub. No.: WO2009/138164
PCT Pub. Date: Nov. 19, 2009

(65) Prior Publication Data
US 2011/0043022 A1  Feb. 24, 2011

(30) Foreign Application Priority Data

May 13, 2008 (DE) .......................... 10 2008 023 943

(51) Int. Cl.
A47C 7/02 (2006.01)
(52) U.S. Cl.
USPC .................................................. 297/452.18
(58) Field of Classification Search
USPC ........................................ 297/452.18, 354.12
See application file for complete search history.

(56) References Cited

U.S. PATENT DOCUMENTS

| | | | |
|---|---|---|---|
| 2,136,122 A | 11/1938 | Almdale | |
| 4,767,155 A * | 8/1988 | Kousaka et al. | 297/284.9 |
| 5,671,976 A * | 9/1997 | Fredrick | 297/452.18 |
| 5,918,943 A * | 7/1999 | Mitschelen et al. | 297/452.18 |
| 6,149,235 A | 11/2000 | Fahim | |
| 6,375,267 B1 * | 4/2002 | Ishikawa | 297/452.18 |
| 6,761,412 B1 * | 7/2004 | Garnweidner et al. | 297/452.18 |
| 6,767,055 B1 | 7/2004 | Sparks | |
| 6,968,598 B2 | 11/2005 | Becker et al. | |
| 7,255,400 B2 * | 8/2007 | Holdampf | 297/391 |
| 2001/0006302 A1 * | 7/2001 | Nagayasu et al. | 297/440.15 |
| 2004/0113481 A1 * | 6/2004 | Saberan et al. | 297/452.18 |
| 2005/0140190 A1 * | 6/2005 | Kawashima | 297/216.14 |
| 2006/0284470 A1 * | 12/2006 | Ogawa et al. | 297/452.18 |
| 2010/0171356 A1 * | 7/2010 | Gross et al. | 297/452.18 |

FOREIGN PATENT DOCUMENTS

| | | |
|---|---|---|
| DE | 3706394 | 5/1988 |
| DE | 41 38 647 C2 | 5/1992 |
| DE | 4436101 | 6/1995 |
| DE | 195 00 914 A1 | 7/1996 |
| DE | WO 00/44582 | 8/2000 |
| DE | 10105282 | 8/2002 |
| DE | 102004007921 | 9/2004 |
| DE | 102006036935 | 10/2007 |
| EP | 1 057 690 A2 | 12/2000 |
| JP | WO 2007/111340 | 10/2007 |
| US | WO 2006/055616 | 5/2006 |

* cited by examiner

Primary Examiner — Milton Nelson, Jr.
(74) Attorney, Agent, or Firm — McGlew and Tuttle, P.C.

(57) ABSTRACT

A vehicle seat (1), in particular a motor vehicle seat, is provided including fixtures (7) that have a first fixture part (11) and a second fixture part (13), and a backrest structure (19) that has lateral cheeks (21) and at least one bar (23, 25) which connects the lateral cheeks (21). The first fixture part (11) is fixedly connected to a seat part (3) of the vehicle seat (1), in particular by an adapter (15). The second fixture part (13) can be twisted relative to the first fixture part (11) between several useful positions in order to adjust the inclination of the backrest (3) of the vehicle seat (1). The backrest structure (19) is fixedly connected to the second fixture part (13), especially by a second adapter (17). The lateral cheeks (21) of the backrest structure (19) are formed by open profiled sections which are closed in a central zone of the lateral cheeks (21) by at least one cross-bar (27) that is fixedly connected to the lateral cheeks (21).

17 Claims, 6 Drawing Sheets

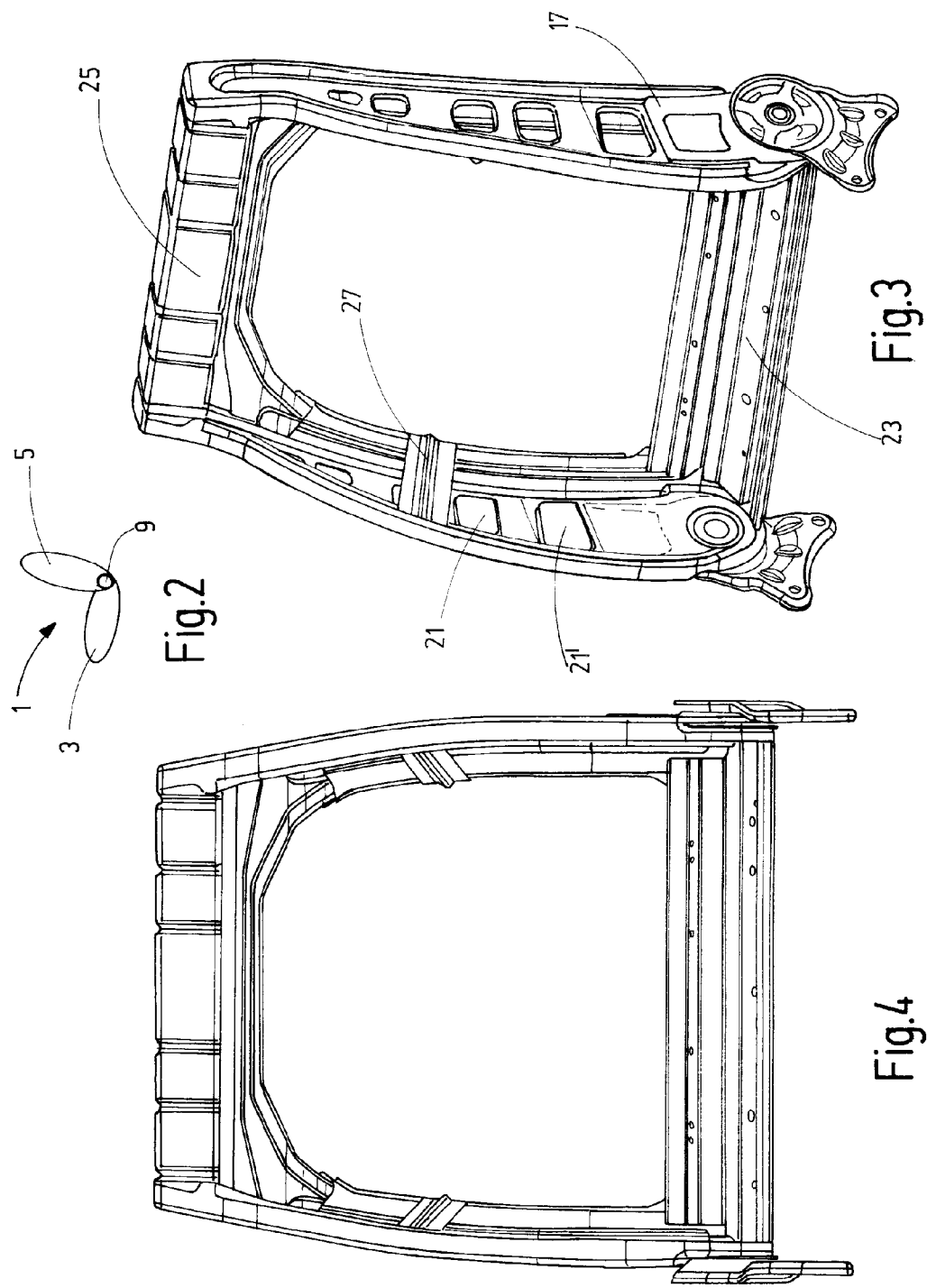

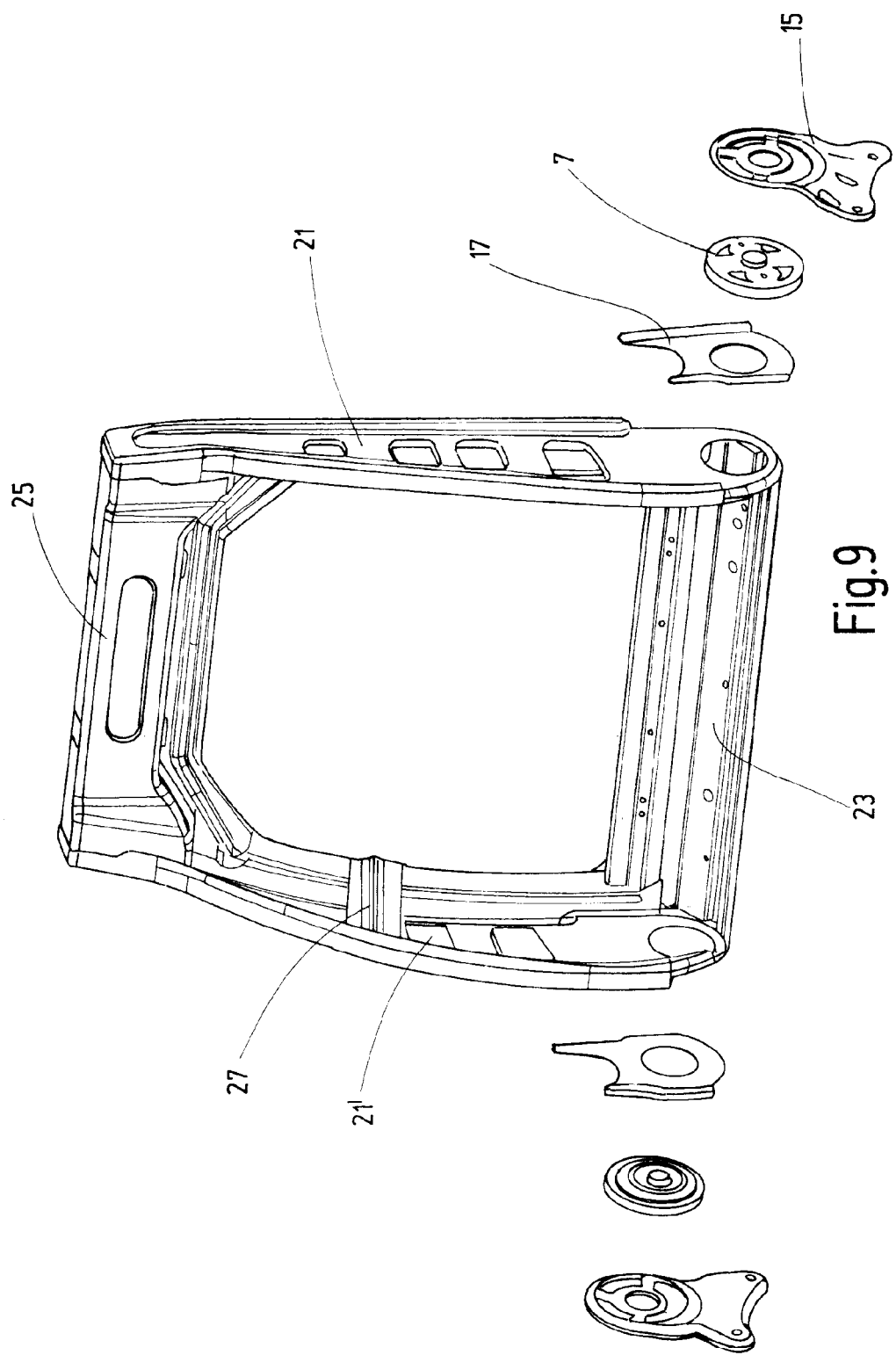

VEHICLE SEAT COMPRISING FIXTURES

CROSS REFERENCE TO RELATED APPLICATIONS

This application is a U.S. National Phase application of International Application PCT/EP2009/003058 and claims the benefit of priority under 35 U.S.C. §119 of DE 10 2008 023 943.7 filed May 13, 2008, the entire contents of which are incorporated herein by reference.

FIELD OF THE INVENTION

The invention relates to a vehicle seat, in particular a motor vehicle seat, comprising fixtures having a first fixture part and a second fixture part, and a backrest structure having lateral cheeks and at least one bar connecting the lateral cheeks.

BACKGROUND OF THE INVENTION

A fixture for a vehicle seat is disclosed in DE 101 05 282 A1, comprising a first fixture part, comprising a second fixture part which may be rotated and locked relative to the first fixture part and comprising a ring which holds both fixture parts together in the axial direction. The first fixture part is pressed into the ring.

DE 44 36 101 A1 discloses a geared fixture comprising a fixture part fixed to the seat part and a pivotable fixture part associated with the backrest, which are connected to one another via a pivot axis. The pivot axis has an eccentric portion which is formed by two wedge segments comprising a driver of the pivot axis, a driver arm engaging between the narrow sides thereof, an energy accumulator forcing apart the wide sides thereof, and if required an adjacent centering segment.

WO 00/44582 A1 discloses a latching fixture comprising a first fixture part, a second fixture part mounted by means of the first fixture part and at least one bolt guided between the first and second fixture part in a guide. The guide forms at the same time a bearing for mounting the first fixture part and the second fixture part.

SUMMARY OF THE INVENTION

The object of the invention is to improve a vehicle seat comprising fixtures of the type described in the introduction.

This object is achieved according to the invention by a vehicle seat comprising fixtures having a first fixture part and a second fixture part and a backrest structure having lateral cheeks and at least one bar connecting the lateral cheeks. The first fixture part is fixedly connected to a seat part of the vehicle seat, in particular by means of an adapter. The second fixture part is able to be rotated for adjusting the inclination of a backrest of the vehicle seat between a plurality of positions of use relative to the first fixture part. The backrest structure is fixedly connected to the second fixture part, in particular via a second adapter. The lateral cheeks of the backrest structure are formed by open profiles. The open profiles being closed in a central region of the lateral cheeks by at least one crossbar which is fixedly connected to the lateral cheeks.

The use of a vehicle seat, in particular of a motor vehicle seat, comprising fixtures, having a first fixture part and a second fixture part and a backrest structure comprising lateral cheeks and at least one bar connecting the lateral cheeks, the lateral cheeks of the backrest structure being formed by open profiles, and the open profile of the lateral cheeks being closed in a central region by a crossbar, permits an optimization of the bending stiffness of the backrest. The crossbar is preferably welded onto the corresponding lateral cheek. The crossbar additionally increases the torsional rigidity of the lateral cheek, which is relevant in the case of force introduced via a headrest. The crossbar additionally ensures that in the event of a side impact the ribs of the occupant do not come into contact with the inside of the C-shaped profile which is formed by the lateral cheeks and which is open to the inside, so that the occupant is protected even in the event of a side impact.

In particular, therefore, the first fixture part may be directly connected to the seat part without a first adapter and/or the second fixture part may be directly connected to the backrest structure without a second adapter.

It is preferred, in particular—without taking into account a crossbar in the region of the attachment of bars on the headrest side and/or seat side between the lateral cheeks, which is required in particular in terms of connection techniques—that only one crossbar is provided, i.e. apart from crossbars possibly present on the end side and said one crossbar provided in the central region, the profile is of open configuration.

Particularly preferably, the lateral cheeks in their longitudinal direction have on both sides an edge region bent back twice by 90°, as well as at least one through-hole, in particular preferably a series of a plurality of through-holes, in the central region along the central longitudinal line of the lateral cheeks. The edge region which is bent back twice permits easy attachment of the crossbar, in particular by means of welding. By the provision of through-holes along the central longitudinal line of the lateral cheeks, material and weight may be saved, the bending stiffness which is reduced by the material saving being able to be compensated by the crossbar. In particular, by the cooperation of the through-holes and the crossbar, an optimized bending stiffness of the backrest may be achieved in each region over the height of the backrest. The torsional rigidity may also be optimized by these measures.

The crossbar is particularly preferably a stamped-bent part made of sheet metal which comprises at least one bead, in particular preferably just one bead, and one or more, in particular two, wing-like regions extending outwardly to the side. The bead provides the sheet metal, even in the case of low sheet metal thicknesses, with sufficient bending stiffness so that the anticipated loads may be easily absorbed. The bead of the crossbar preferably runs in the center perpendicular to and/or relative to at least one of the front and rear side surfaces of the lateral cheeks.

Preferably, the lateral cheeks at the end on the seat side are connected to one another via a bar on the seat side and/or on the headrest side, the bar being formed by a stamped-bent part. The bars are particularly preferably fixedly connected to the lateral cheeks by means of welded joints but other connections, such as for example riveted, screw, plug-in or clip connections, are also conceivable.

The lateral cheeks may be connected to the fixtures via an adapter, the adapter having a circular through-hole and a bent-back edge along both longitudinal sides. The bent-back edge increases the bending stiffness and ensures that the adapter is not already twisted before attaching to the lateral cheeks and flat contact may be ensured. The connection is preferably made by means of a welded joint, in particular by means of individual welding points or welding beads, particularly preferably by means of CMT (cold metal transfer) welding. Naturally, direct attachment without an adapter is also possible.

The adapter preferably has a second through-hole or a cutout which is configured to extend between the bent-back edges. Firstly, material may be saved by means of said through-hole and/or cutout. Secondly, the bending stiffness may also be influenced by the shape of the through-hole and/or cutout. Also, the correspondingly configured adapters increase the torsional rigidity of the lateral cheeks in the lower region, so that the deformation of the backrest structure may be reduced as a whole, in particular preferably without the weight thereof having to be increased.

If both crossbars and correspondingly configured adapters are provided on the lateral cheeks, the stiffness distribution may be optimized relative to torsional stress and bending load, in particular a distribution of stiffness which is as even as possible may be implemented. In this case, there is preferably no change in stiffness in the stiffness distribution, i.e. it is constant. Particularly preferably, a parabolic distribution of stiffness is provided.

The second through-hole is particularly preferably of approximately rectangular configuration, the corner regions being rounded but the shape also being able to be configured to be open at the end, so that a type of fork is produced.

The invention is able to be used, for example, in longitudinally adjustable vehicle seats of two-door motor vehicles with central free-pivoting of the backrest, but may also be used for other vehicle seats. The type of fixtures is not specifically restricted, thus latching fixtures or any other type of fixtures may be provided.

The invention is described in more detail hereinafter with reference to two embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a side view of a vehicle seat according to the invention;

FIG. 3 is a perspective view of the backrest structure comprising the fixture according to the invention;

FIG. 4 is a front view of the backrest structure comprising the fixture of FIG. 3;

FIG. 9 is an exploded view of the second exemplary embodiment according to the invention;

DESCRIPTION OF THE PREFERRED EMBODIMENTS

Figure 1:
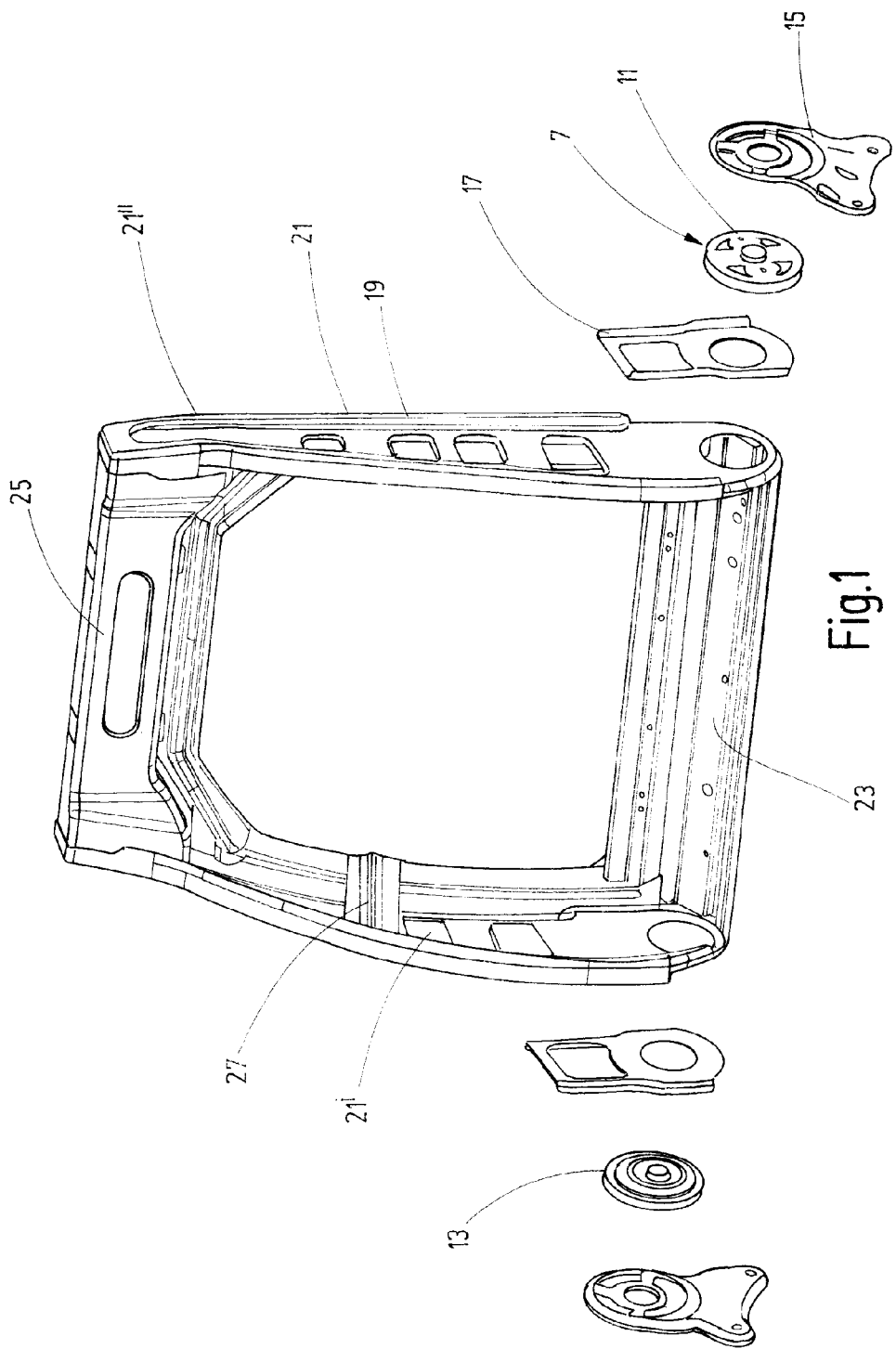
FIG. 1 is an exploded view of the first exemplary embodiment according to the invention.

Referring to the drawings in particular, according to the first exemplary embodiment, a vehicle seat 1 has a seat part 3 and a backrest 5 which may be pivoted relative to the seat part 3 about a horizontal pivot axis extending through two fixtures 7 (a fixture 7 at each side). On the outside of one of the fixtures 7, a hand wheel 9 is arranged, said hand wheel being used for adjusting the inclination of the backrest 5. Moreover, a hand lever is provided for the free-pivoting function, said hand lever, however, not being shown.

Each fixture 7 comprises as a core a first fixture part 11 and a second fixture part 13, which in structural terms together with a clasping ring (for holding the two fitting parts 11 and 13 together) form a disk-shaped unit with the a first fitting part 11, and a second fitting part 12 being swivelled and locked relative to each other, as is disclosed for example in DE 101 05 282 A1, the disclosure thereof being expressly included in the invention (and corresponding U.S. Pat. No. 6,799,806 is incorporated herein by reference in its entirety). The two fixture parts 11 and 13 cooperate as geared fixtures or as latching fixtures.

A first adapter 15 is fixedly attached to the first fixture part 11 and a second adapter 17 is fixedly attached to the second fixture part 13 by means of welded joints. The first fixture part 11 is connected via said first adapter 15 to the structure (not shown) of the seat part 3, and the second fixture part 13 is connected via said second adapter 17 to the backrest structure 19.

The second adapter 17 is configured as a stamped-bent part made of sheet metal, the sheet metal having a uniform sheet metal thickness. The backrest structure 19 is formed by a plurality of individual stamped-bent parts, the individual parts being welded together substantially to form a frame. Due to the mirror-symmetrical construction—apart from the hand wheel 9 which is arranged on only one side of the vehicle seat 1—hereinafter reference is only made to one side of the backrest structure 19 and a second adapter 17 together with the fixture 7 attached thereto by means of welded joints.

Figure 11:
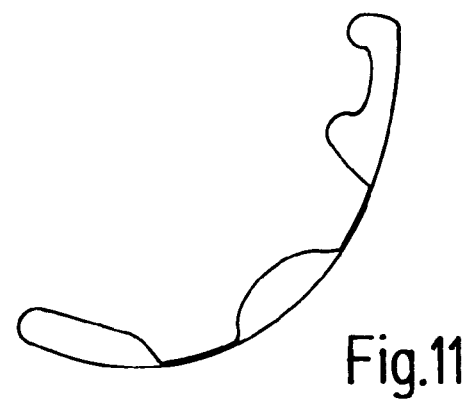
FIG. 11 is a sectional view through a bar of the backrest structure.

The backrest structure 19 substantially has four regions connected at right angles to one another and bent to form open profiles, namely two lateral cheeks 21, a bar 23 on the seat side and a bar 25 on the headrest side. In particular, the lateral cheeks 21 and the bar on the seat side 23 are bent or rolled in a C-shape so that the open side faces inward. An example of such a bar 23, as used in the present exemplary embodiment, is shown in section in FIG. 11.

In the lateral cheeks 21 on the inside a small edge region is bent inward, the two edge regions being aligned with one another. Moreover, in the lateral cheeks 21 a plurality of through-holes 21' are provided, said through-holes in particular being used for saving material and weight, the lateral cheeks 21 additionally providing a certain rigidity. Along the outside edges extends an outwardly bent bead 21", on one side from bottom to top and downward again along the upper end of the lateral cheeks 21 on the other edge.

Figure 6:
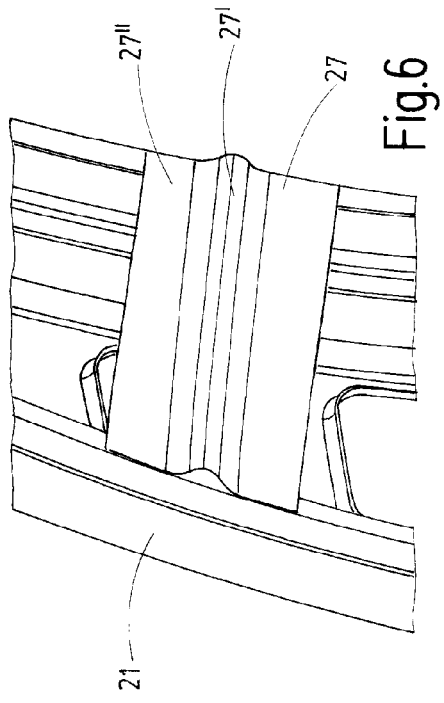
FIG. 6 is a detailed view of a region of the backrest structure showing a transverse reinforcement.

In the longitudinal direction, approximately in the middle of the lateral cheeks 21, a crossbar 27 is welded between the two side walls to the inwardly bent edge regions of the C-shaped profile. The crossbar 27 is in the present case formed by a substantially rectangular stamped-bent part made of sheet metal of uniform thickness bent with a rounded V-shaped bead 27' (see FIG. 6), the bead 27' being oriented in the direction of the center of the backrest structure 19, i.e. away from the corresponding lateral cheek 21. To the right and left of the bead 27' extend wing-like edge regions 27" which provide a secure welded joint between the lateral cheek 21 and the crossbar 27. The longitudinal extension of the bead 27' is substantially perpendicular to the two opposing outer surfaces of the C-shaped profile forming the lateral cheek 21. Moreover, the crossbar 27 in the present case is arranged at the same height as one of the through-holes 21' in the lateral cheek 21.

Figure 5:
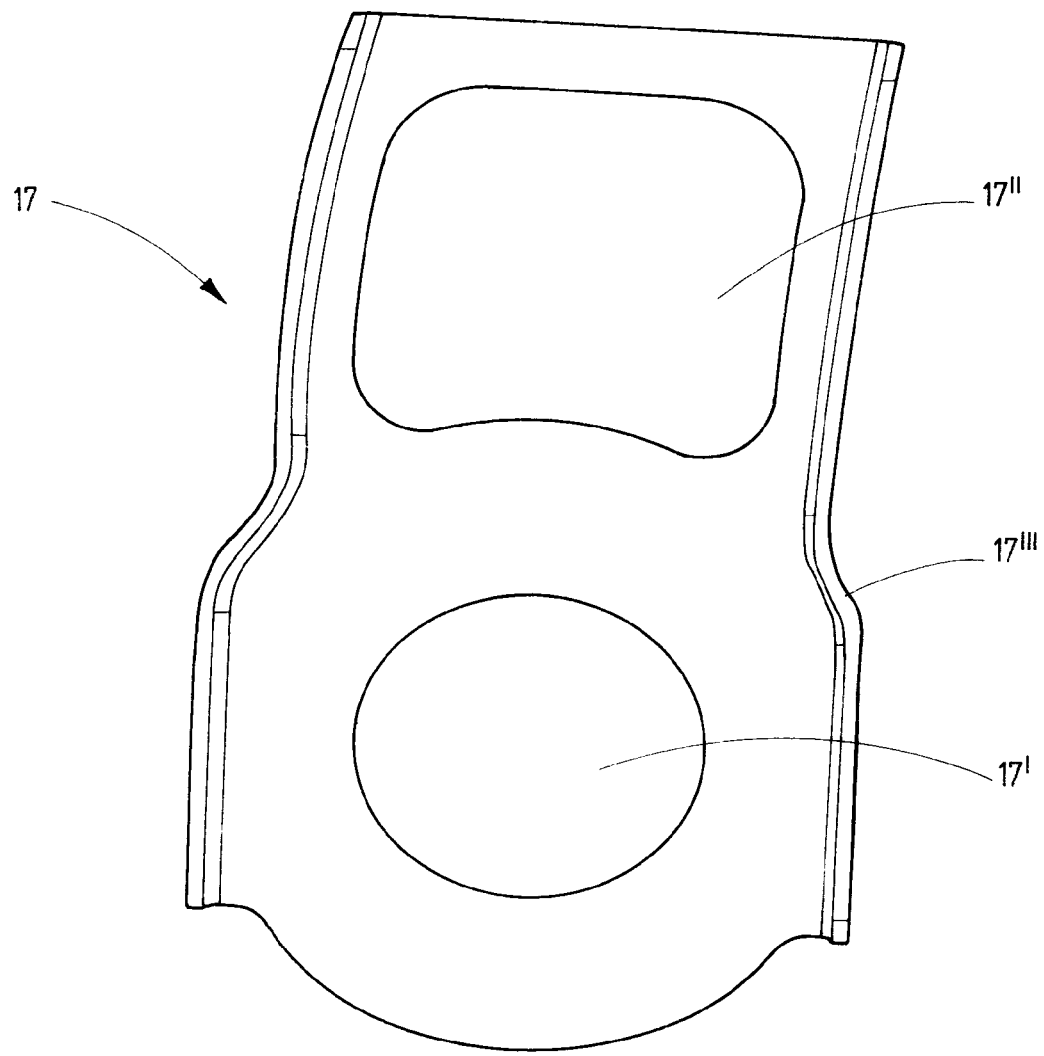
FIG. 5 is a side view of the upper fixture part of FIG. 1.

In the lower region of the lateral cheek 21 in each case the second adapter 17 of the corresponding fixture 7 is welded from the outside, said second adapter being arranged between opposing beads 21" (see FIG. 3). The second adapter 17 is formed by a stamped-bent part made of sheet metal of uniform thickness, which comprises a first through-hole 17' with a circular cross-section for the fixture 7 and a second through-hole 17" with a rounded rectangular cross section in the region of the attachment to the lateral cheek 21 as well as two edges 17''' bent back twice on the longitudinal sides, which face outward when attached to the lateral cheek 21. The width of the second adapter 17 is reduced slightly between the region in which the first through-hole 17' is arranged and the region in which the second through-hole 17" is arranged, an approximately circular area having a width being created around the first through-hole 17'. In the region around the second through-hole 17" an area of approximately constant width is also provided, the width (without taking into account the double bent-back edge 17''') being approximately half the size of the width of the circular area (see FIG. 5).

Figure 8:
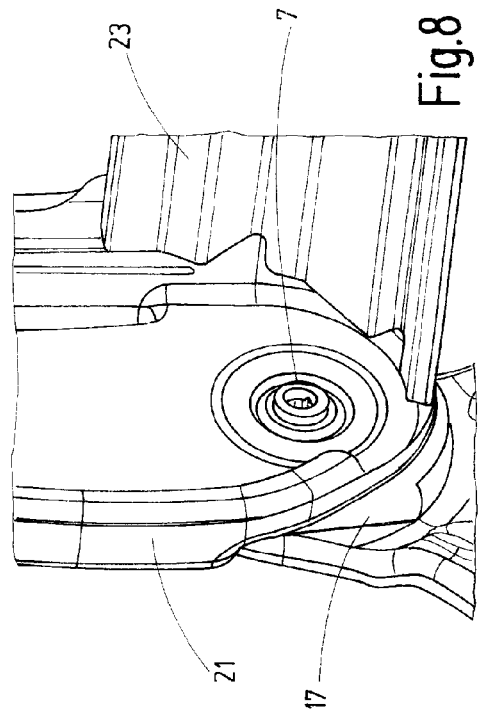
FIG. 8 is a detailed view of a lower corner of the backrest structure.
Figure 7:
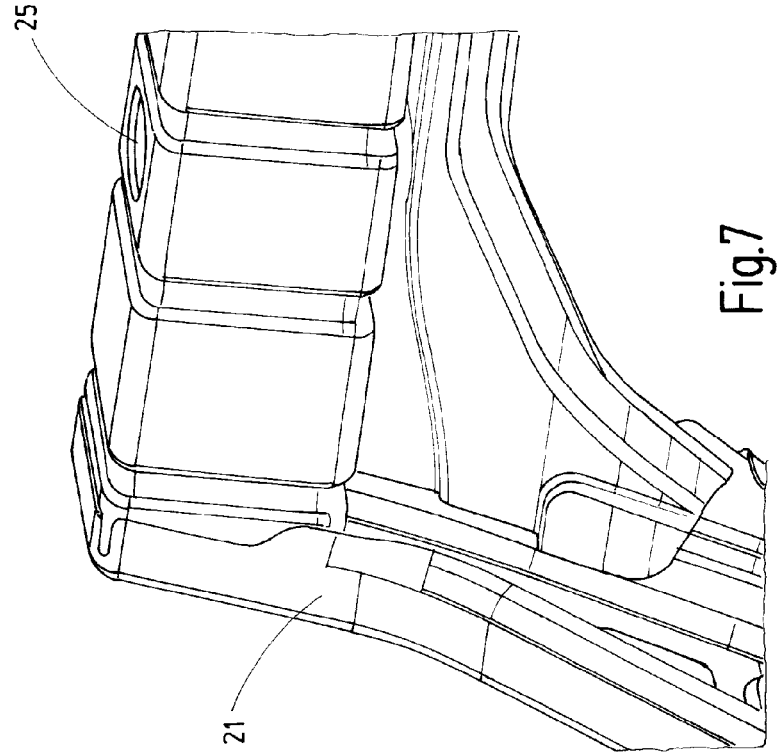
FIG. 7 is a detailed view of an upper corner of the backrest structure.

The bar 23 on the seat side is also formed by a rectangular metal sheet which is provided with a plurality of kinks in the longitudinal direction, said metal sheet having an approximately arcuate path (see FIG. 8). At the end in the lower region of the lateral cheeks 21 said metal sheet is welded to an edge region thereof protruding in the direction of the other respective lateral cheek, i.e. in this region the edge of the lateral cheeks 21 is not bent inwardly again, as it is in the central region of the lateral cheeks in which the crossbar 27 is provided.

The bar 25 on the headrest side is also formed by a stamped-bent part which is welded to protruding regions of the lateral cheeks 21. In the bar 25, amongst other things, openings are provided for passing through the limbs of the headrest. Moreover, beads are provided extending in the present case transversely to the longitudinal direction.

Figure 10:
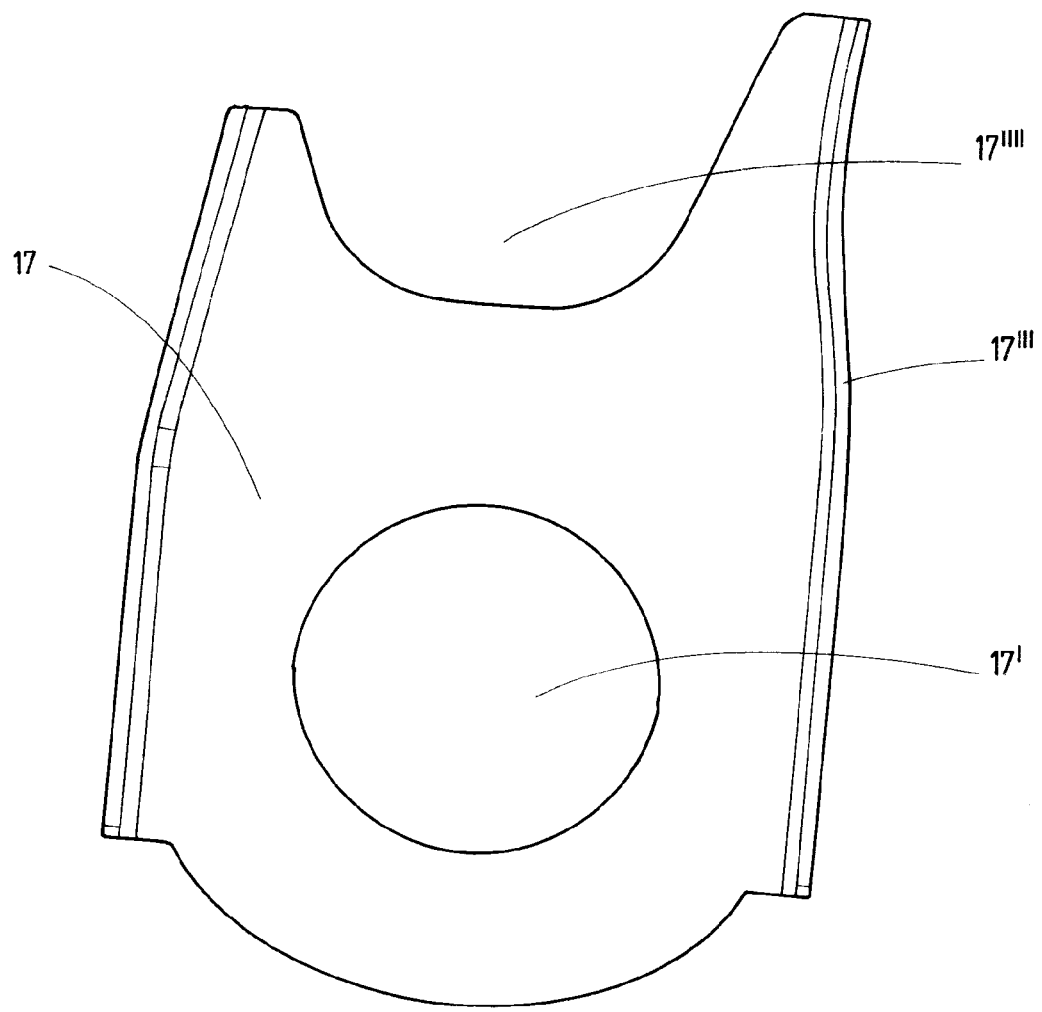
FIG. 10 is a side view of the upper fixture part of FIG. 9.

According to the second exemplary embodiment shown in FIGS. 9 and 10, which corresponds to the first exemplary embodiment—if it is not expressly mentioned hereinafter—elements which are the same or act in the same manner are provided with the same reference numerals. The only difference from the first exemplary embodiment is the second adapter 17 which at the point of the second through-hole 17" has a cutout 17''' which in the present case is fork-like, i.e. the second through-hole is of open configuration on the upper end of the adapter 17 on the headrest side. The two tines of the fork have different lengths, the tine arranged on the rear side of the backrest being longer than the tine arranged on the front side. Both opposing longitudinal sides of the second adapter 17 are in turn provided with a double bent-back edge 17'''.

Moreover, in the present case the embodiment of the bar 25 on the headrest side which is also formed by a stamped-bent part made of sheet metal differs from that of the first exemplary embodiment, the transversely extending beads being dispensed with in the bar and an opening extending in the longitudinal direction being provided.

According to a further third exemplary embodiment, not shown in the drawings, the first fixture part is directly connected to the seat part without the first adapter and the second fixture part is directly connected to the backrest structure without the second adapter. Otherwise, the embodiment corresponds to that of the first exemplary embodiment. Also in this case, the lateral cheeks and bars are of profiled configuration and, moreover, crossbars are provided on the lateral cheeks, so that the stiffness distribution may be optimized relative to torsional stress and bending load, in particular a distribution of the stiffness which is as even as possible may be implemented. In this case, there is preferably no change in stiffness in the stiffness distribution, i.e., it is constant. Particularly preferably, a parabolic distribution of stiffness is provided.

In a modification of the third exemplary embodiment, a combination of directly attaching the first fixture part to the seat part and attaching the second fixture part by means of an adapter to the backrest structure or attaching the first fixture part by means of an adapter to the seat part and directly attaching the second fixture part to the backrest structure is also possible.

While specific embodiments of the invention have been described in detail to illustrate the application of the principles of the invention, it will be understood that the invention may be embodied otherwise without departing from such principles.

The invention claimed is:

1. A vehicle seat, comprising:
fixtures, each of the fixtures having a first fixture part and a second fixture part;
a backrest structure having lateral cheeks and at least one bar connecting the lateral cheeks, said lateral cheeks being connected to the fixtures via an adapter, the adapter having a circular through-hole and a bent-back edge along two longitudinal sides, the first fixture part being fixedly connected to a seat part of the vehicle seat and the second fixture part being able to be rotated for adjusting the inclination of a backrest of the vehicle seat between a plurality of positions of use relative to the first fixture part, the backrest structure being fixedly connected to the second fixture part; and
at least one crossbar fixedly connected to each of the lateral cheeks, the lateral cheeks of the backrest structure being formed by open profiles, each open profile being closed in a central region of the lateral cheeks by the respective at least one crossbar.

2. The vehicle seat as claimed in claim 1, wherein the lateral cheeks at the end on a headrest side are connected to one another via one bar on the headrest side, the one bar being formed by a stamped-bent part.

3. The vehicle seat as claimed in claim 1, wherein the lateral cheeks at the end on a seat side are connected to one another via one bar on the seat side, the one bar being formed by a rolled and formed part.

4. The vehicle seat as claimed in claim 1, wherein the lateral cheeks of the backrest structure are formed by C-shaped profiles which are open in the direction of a central plane of the vehicle seat, the crossbar connecting the free end regions of the limbs of the respective C-shaped profile in the central region of the lateral cheeks.

5. The vehicle seat as claimed in claim 1, wherein the lateral cheeks in their longitudinal direction on both sides have an edge region bent back twice by 90° as well as at least one through-hole in the central region along a central longitudinal line.

6. The vehicle seat as claimed in claim 5, wherein the lateral cheeks comprise two beads extending parallel to the edge region, which extend outwardly away from the crossbar.

7. The vehicle seat as claimed in claim 5, wherein the crossbar is a stamped-bent part made of sheet metal, which comprises at least one bead extending in the longitudinal direction of the part and two regions extending outwardly to the side of the bead.

8. The vehicle seat as claimed in claim 7, wherein the bead of the crossbar is arranged in the center perpendicular to and/or relative to at least one of the front and rear side surfaces of the lateral cheeks.

9. The vehicle seat as claimed in claim 1, wherein the adapter has a second through-hole or a cutout which is configured to extend between the bent-back edges.

10. The vehicle seat as claimed in claim 9, wherein the second through-hole is of approximately rectangular configuration.

11. A motor vehicle seat comprising:
a first side fixture comprising a first side first fixture part and a first side second fixture part;
a second side fixture comprising a second side first fixture part and a second side second fixture part;
a backrest structure comprising a first side lateral cheek and a second side lateral cheek and a bar connecting the lateral cheeks;
a seat part;
a first side first adapter part;
a second side first adapter part, each first fixture part being fixedly connected to the seat part via the respective first adapter part and each second fixture part being able to be rotated relative to the respective first fixture part for adjusting the inclination of the backrest structure between a plurality of positions of use relative to each first fixture part;
a first side second adapter;
a second side second adapter, the backrest structure being fixedly connected to each second fixture part via the respective second adapter;
a first side crossbar fixedly connected to the first side lateral cheek; and
a second side crossbar fixedly connected to the second side lateral cheek, each of the first side lateral cheek and the second side lateral cheek being formed by open profiles, each open profile being closed in a central region by the respective first side crossbar and second side crossbar.

12. The vehicle seat as claimed in claim 11, wherein:
each of the lateral cheeks, at a headrest side, is connected to the other of the lateral cheeks via a bar formed by a stamped-bent part; and
each of the lateral cheeks, at a seat side are connected to the other of the lateral cheeks by the bar, the bar being formed by a rolled and formed part.

13. The vehicle seat as claimed in claim 11, wherein:
each first adapter has a circular through-hole and a bent-back edge along longitudinal sides; and
each first adapter has a second through-hole or a cutout configured to extend between the bent-back edges.

14. The vehicle seat as claimed in claim 11, wherein the lateral cheeks in their longitudinal direction on both sides have an edge region bent back twice by 90° as well as at least one through-hole in a central region along a central longitudinal line.

15. The vehicle seat as claimed in claim 14, wherein the lateral cheeks comprise two beads extending parallel to the edge region, which extend outwardly away from the respective crossbar.

16. The vehicle seat as claimed in claim 14, wherein each crossbar is a stamped-bent part made of sheet metal, each crossbar comprising at least one bead extending in a longitudinal direction of the part and two regions extending outwardly to the side of the bead.

17. The vehicle seat as claimed in claim 16, wherein the bead of each crossbar is arranged in a center perpendicular to and/or relative to at least one of the front and rear side surfaces of the respective lateral cheek.

\* \* \* \* \*